Patented Sept. 13, 1932

1,876,975

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF HIGHLY HALOGENATED DERIVATIVES OF PYRANTHRONE

No Drawing. Application filed March 8, 1929, Serial No. 345,586, and in Germany March 10, 1928.

This invention relates to the production of highly halogenated derivatives of pyranthrones.

We have found that derivatives of pyranthrone containing more than 4 halogen atoms are simply and easily produced on a large scale by halogenating pyranthrone or its derivatives, including the halogenpyranthrones, which contain 1 to 4 halogen atoms in the molecule, in a sulphuric acid compound which term is to be understood as comprising oleum, chlorosulphonic acid, sulphuryl chloride which may also be used in mixture with each other, at temperatures between about 60° and 100° C. in the presence of a halogen carrier. According to this manner of working, as for example by brominating pyranthrone in chlorosulphonic acid, it is possible to obtain penta-, hexa-, octo- halogenpyranthrones, and still more highly halogenated derivatives, without the application of pressure. When brominating pyranthrones in chlorosulphonic acid at temperatures above 60° C., in many instances, the simultaneous introduction of chlorine takes place. As halogen carriers those usually employed, for example, iodine, sulphur, selenium, iron, manganese, antimony, mercury and the like may be used and it is often advantageous to employ several carriers instead of one, these being introduced simultaneously or successively in any known and suitable manner. If the above described reaction be applied to the mono-, di,- tri- and tetra-halogen derivatives instead of to pyranthrone itself, similar results are obtained, and it is easy, in this way, to obtain halogen derivatives containing different halogens. The yields are in all cases excellent, and the products are obtained directly in a pure state. They crystallize out from solvents of high boiling point, in which they are very sparingly soluble, in the form of fine needles, dissolve mostly to a blue or violet blue solution, in chlorosulphonic acid, or more sparingly in concentrated sulphuric acid, and either themselves form dyestuffs with excellent properties, or constitute valuable intermediate products suitable for application in the dyestuff industry.

The following examples further illustrate the nature of the said invention which however is not restricted to these examples. The parts are by weight.

Example 1

A solution of 40 parts of pyranthrone in chlorosulphonic acid is treated with an addition of 4 parts of iodine at ordinary temperature, after which 80 parts of bromine are stirred in. The temperature is then slowly raised to 70° C. and maintained thereat until the reaction is complete. After cooling, the reaction mixture is diluted with concentrated sulphuric acid, and the resulting dyestuff is caused to separate out by pouring the mixture into ice water, followed by filtration, washing and drying. The resulting orange red powder represents a pentabromo-pyranthrone which dissolves with difficulty to a blue solution in concentrated sulphuric acid, and can be recrystallized, from large quantities of solvents of high boiling point, such as nitrobenzene, in the form of uniform red needles. Very fast scarlet dyeings are obtained on cotton from a violet vat.

Example 2

40.6 parts of pyranthrone are dissolved in 400 parts of chlorosulphonic acid by stirring, and after the addition of 4 parts of selenium and 80 parts of bromine, are slowly warmed to from 65° to 70° C. At the end of a short interval, 4 parts of antimony and another 60 parts of bromine are added. Stirring is continued until the greater portion of the bromine has been taken up by the reaction mixture; and, when cold the further treatment proceeds as in Example 1. The resulting reaction product a pentabrommonochloropyranthrone, is an orange red powder which is soluble, only with difficulty, to a blue solution in concentrated sulphuric acid. If phosphorus of molybdenum be employed in the place of selenium, products are obtained with properties identical with the above.

Example 3

4 parts of iodine and 100 parts of bromine are added to 36 parts of tetrabromopyranthrone in 360 parts of chlorosulphonic acid at ordinary temperature, the whole being then warmed to from 65° to 75° C. and kept stirred at that temperature until the reaction is complete. When cold, the further treatment proceeds as in Example 1. The resulting reaction product, which dissolves only with difficulty to a blue solution in concentrated sulphuric acid, is a hexabromodichloropyranthrone, and constitutes a valuable intermediate product for the preparation of new dyestuffs.

What we claim is:—

1. As a new article of manufacture pentabromopyranthrone difficultly soluble to a blue solution in concentrated sulphuric acid, crystallizing from nitrobenzene in red needles and dyeing cotton from a violet vat scarlet shades.

2. As new articles of manufacture pyranthrones containing from 5 to 8 atomic proportions of halogen forming orange to red needles difficultly soluble in sulphuric acid but readily soluble in oleum and chlorosulphonic acid to give greenish blue to blue solutions and dyeing cotton orange to orange red shades from blue-violet to violet vats.

In testimony whereof we have hereunto set our hands.

MAX ALBERT KUNZ.
KARL KOEBERLE.